United States Patent [19]

Massierer

[11] Patent Number: 5,067,403
[45] Date of Patent: Nov. 26, 1991

[54] CIRCUMFERENTIAL REGISTER ADJUSTMENT SYSTEM FOR A PRINTING MACHINE CYLINDER

[75] Inventor: Hartmut Massierer, Neusäss, Fed. Rep. of Germany

[73] Assignee: Man Roland Druckmaschinen AG, Offenbach am Main, Fed. Rep. of Germany

[21] Appl. No.: 528,584

[22] Filed: May 24, 1990

[30] Foreign Application Priority Data

Jun. 30, 1989 [DE] Fed. Rep. of Germany ....... 3921583

[51] Int. Cl.$^5$ ............................................. B41F 13/14
[52] U.S. Cl. .................................... 101/248; 101/181
[58] Field of Search ............... 101/247, 248, 181, 182, 101/183, 191, 192

[56] References Cited

U.S. PATENT DOCUMENTS

| | | | |
|---|---|---|---|
| 3,308,752 | 3/1967 | Stevenson | 101/248 |
| 3,786,749 | 1/1974 | Vir Singh | 101/247 |
| 3,945,266 | 3/1975 | Dufour et al. | 101/248 X |
| 4,006,685 | 2/1977 | Mosemiller | 101/248 |
| 4,137,845 | 2/1979 | Jeschke | 101/248 |
| 4,457,231 | 7/1984 | Kawaguchi | 101/248 X |
| 4,709,634 | 12/1987 | Momot et al. | 101/248 |
| 4,896,600 | 1/1990 | Rogge et al. | 101/182 |

FOREIGN PATENT DOCUMENTS 760685 2/1953 Fed. Rep. of Germany .
2705522 11/1978 Fed. Rep. of Germany .

*Primary Examiner*—Edgar S. Burr
*Assistant Examiner*—Christopher A. Bennett
*Attorney, Agent, or Firm*—Frishauf, Holtz, Goodman & Woodward

[57] ABSTRACT

To provide for circumferential register adjustment of a printing cylinder, for example a plate or forme cylinder (1) of a printing machine, in which the cylinder is eccentrically retained in an eccentric bearing (5, 6, 7) to permit throw-off of the cylinder from an engaged cylinder, such as a blanket cylinder, a circumferential register adjustment positioning shaft (8) is threadedly secured to a counter plate (13), attached to the frame of the machine. The positioning shaft is coupled via an eccentric bushing (18) to the drive gear (3) of the cylinder. The eccentricity of the eccentric bushing, and the eccentricity of the eccentric bearing (5, 6, 7) for the cylinder are the same, and the eccentric bushing and the eccentric bearing are coupled together by a coupling rod (23) and an extension (25, 25) on the eccentric bushing. Bearings permit both relative rotation, eccentric rotation, and axial shift of the drive gear under control of the positioning shaft.

7 Claims, 1 Drawing Sheet

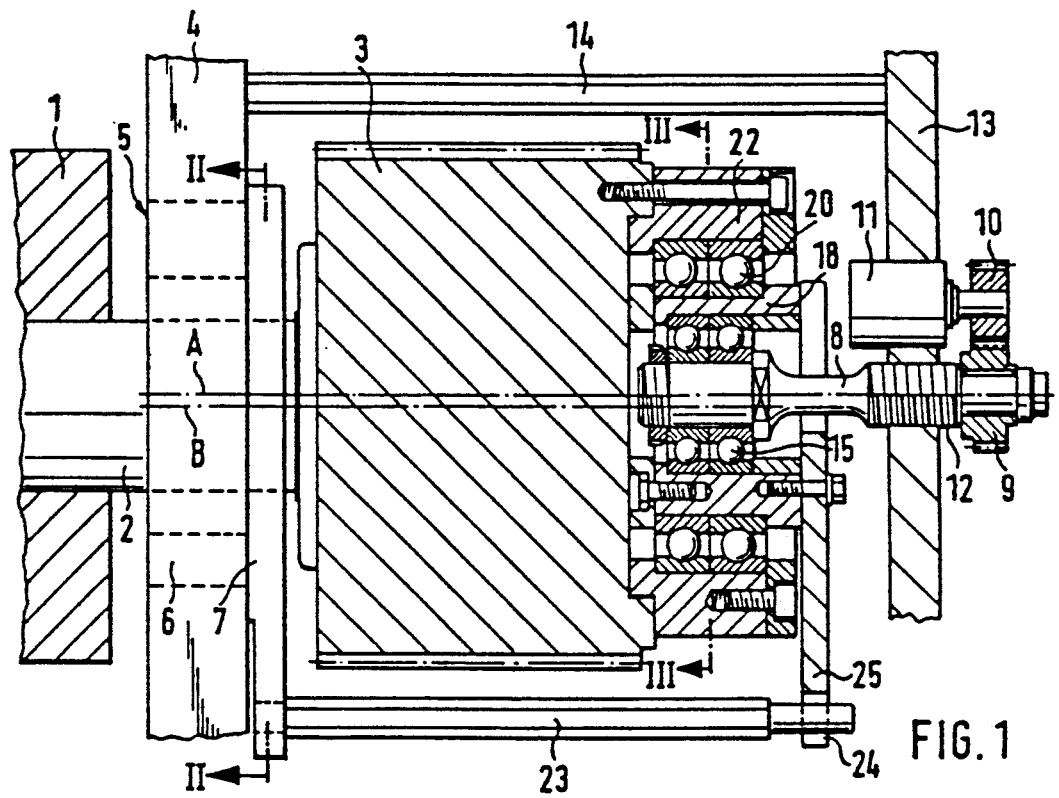
FIG. 1
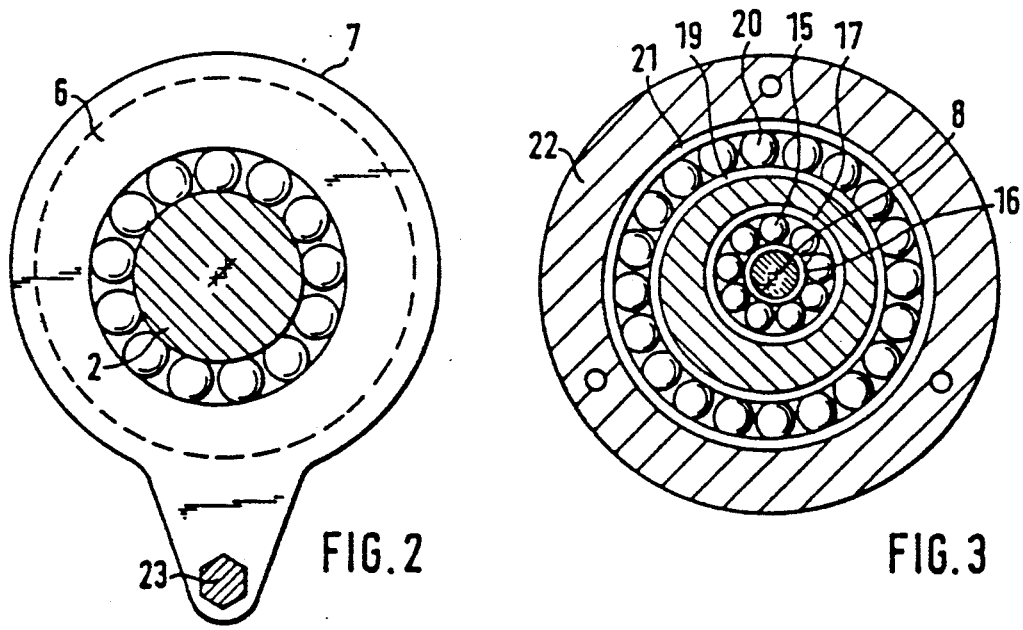
FIG. 2
FIG. 3

CIRCUMFERENTIAL REGISTER ADJUSTMENT SYSTEM FOR A PRINTING MACHINE CYLINDER

REFERENCE TO RELATED PUBLICATION

German Patent No. 760 685.

FIELD OF THE INVENTION.

The present invention relates to printing machines, and more particularly to adjusting the circumferential register of a printing machine cylinder, typically a plate or forme cylinder, which is retained in eccentrically mounted bearing bushings and in which, even upon throw-off of the cylinder from a printing position, the circumferential register adjustment will not be affected.

BACKGROUND

Circumferential register of printing machine cylinders, for example cylinders carrying an image to be printed, such as a forme or a plate cylinder of a printing machine, by axially shifting the cylinder upon axially moving a drive wheel with spiral or inclined gears, is known, see for example German Patent 760 685. In the known arrangement, the shaft of the cylinder is retained in the printing machine in a predetermined, fixed position. This means that the cylinder will always be in engagement with other cylinders or rollers of the printing machine, and that the cylinder itself cannot be moved between an engaged or printing position and the release or thrown-off position. In the known arrangement, the only movement which the cylinder can carry out, besides rotation about its shaft axis, is an axial movement of the cylinder with respect to an engaged or counter cylinder, thereby setting or determining the circumferential register of the printing image.

THE INVENTION

It is an object to improve the positioning system for cylinders subject to circumferential register adjustment such that it can be used with cylinders which have their shafts movable within the printing machine, so that the cylinder can be moved between an engaged and a throw-off position, and in which, nevertheless, the circumferential register adjustment apparatus does not move with the cylinder, but remains fixed and secured to the printing machine frame, for example.

Briefly, a coupling system is provided for coupling a positioning shaft which moves axially and controls the circumferential register to the drive gear of the cylinder in any selected position of the bearing for the cylinder in the side wall of the machine, that is, regardless of the relative positions of the bearing axis with respect to the shaft axis. The system includes an eccentric bushing, axially fixed to the positioning shaft but rotatable with respect thereto, the eccentric bushing being coupled to the drive gear while maintaining an axially fixed predetermined relationship of the eccentric bushing with respect to the drive gear, but permitting relative rotation of the bushing and the drive gear. The eccenter used to shift the axis of the printing cylinder is coupled by a connecting link arrangement with the eccentric bushing for conjoint rotation, the eccentricities of the eccentric bushing and of the eccenter for the drive shaft being so arranged relative to each other that the position of the axis of the positioning shaft is invariable even upon rotation of the cylinder eccenter.

The system has the advantage that, upon adjusting the positioning shaft, the axial end or an axial reference position thereof determines the circumferential register adjustment of the printing machine cylinder. The printing machine cylinder can be moved between engaged and throw-off position, by its customarily used eccenter, change of the position of the printing cylinder, however, leaving the circumferential register adjustment unaffected. The system requires very little space and the weight of components or the masses of components used to maintain the register, regardless of cylinder position, is small and negligible, so that no additional energy requirements are placed on the apparatus to change the position of the printing cylinder within the side wall of the machine. Such apparatus, frequently, involve hydraulic or pneumatic piston-cylinder arrangements.

DRAWINGS

FIG. 1 is a fragmentary axial cross-sectional view through a cylinder and, further, through the register control adjustment in accordance with the present invention;

FIG. 2 is a diametric cross-sectional view taken along line II—II of FIG. 1; and FIG. 3 is a diametric cross-sectional view taken along line III—III of FIG. 1.

DETAILED DESCRIPTION

A cylinder 1 (FIG. 1) carrying a printed image may, for example, be the plate cylinder of an offset printing machine. A blanket cylinder, damper rollers and inker rollers can be engaged against the cylinder 1; none of them are shown since they do not form the subject matter of the present invention and can be in accordance with any well known and suitable construction.

Cylinder 1 is secured to a shaft 2, to rotate with the shaft 2 on which the cylinder 1 is axially movable. Shaft 2 further carries a drive gear 3, which has inclined or spiral teeth. A power transmitting gear, not shown, meshes with the drive gear 3 to provide drive power to the cylinder !. The power drive gear forms part of the power drive for the printing machine. Shaft 2 is journalled in a side wall 4 of the printing machine within an eccentric bearing 5. The eccentric bearing 5 has an outer ring 6 (FIG. 2), rotatable in the side wall 4 about an axis A. A positioning ring 7, preferably unitary with the outer ring 6, is located immediately adjacent the side wall 4. Upon rotation of the eccenter bearing 5 in counterclockwise (CCW) direction, the axis of rotation B of the cylinder 1 moves with respect to the eccenter axis A. This movement permits throwing off cylinder 1 from an adjacent cylinder, for example the blanket cylinder of a printing machine, and inker and damper rollers. Upon movement in the opposite direction, the cylinder 1 is again engaged for printing.

Circumferential register of the cylinder 1 is provided by a positioning shaft 8 which carries a gear 9 at an end thereof. The gear 9 meshes with a pinion 10 secured to the shaft of a positioning motor 11. The positioning shaft 8 is threaded, as seen at 12, and engaged in a tapped bore of a counter plate 13. The counter plate 13 is secured to the side wall 4 in fixed position, for example by a frame structure or one or more carrier rods 14, of which only one is shown in FIG. 1. The axis of positioning shaft 8 is also axis A.

In accordance with a feature of the invention, a system is provided such that movement of the position of cylinder 1, in its eccentric bushing, will be reflected in the axial positioning arrangement which includes the positioning shaft 8, the threaded engagement of the thread 12 thereof with the plate 13 and the positioning elements 9, 10, 11. This system includes a bearing 15, preferably a ball bearing, having an inner race 16 secured on the positioning shaft 8, and an outer race 17 positioned in the interior of an eccenter bushing or sleeve 18. The outer circumference of the eccenter bushing or sleeve 18 carries the inner race 19 of a second bearing 20, the outer race 21 of which is secured in a retention sleeve 22. Retention sleeve 22 is securely attached to the gear 3, for example by screws, only one of which is shown. Rather than using ball bearings, the races of which are axially fixed in the respective sleeves or bushings by being retained within grooves thereof defining shoulders for the races, suitable slide bearings could be used; in such a case, the shaft 8, eccenter bushing 18 and retention bushing 22 must be provided with suitable abutment or engagement surfaces to ensure that the respective bearings or shafts do not move axially with respect to each other.

The eccenter bearing 5 is coupled to a carrier arm 25 which is securely connected to the eccenter bushing 18, for example by being screwed thereto. The coupling between the eccenter bearing 5 and the carrier arm 25 is formed by a connecting rod 23 which engages in a fork-shaped opening or extension portion 24 on the carrier arm 25.

In accordance with a feature of the invention, the eccentricities of the eccenter bushing 18 and of the eccenter bearing 5 are the same and so located that they are similarly directed.

Operation

To control the circumferential register, positioning shaft 8 is rotated by rotating the positioning motor 11. This rotation, via pinion 10 and gear 9, rotates the positioning shaft 8 which, then, screws in and out, in dependence on the direction of rotation, within the tapped opening of the plate 13. In accordance with a feature of the invention, the axial shift of the positioning shaft 8 is transferred to the eccenter bushing 18 and hence via the sleeve 22 on the drive gear 3. Due to the inclined or spiral gearing of the drive gear 3, the drive gear 3 will rotate with respect to the power gear of the power drive chain by a small angle which, thus, changes the circumferential position of the cylinder 1. Upon rotation of the eccenter bearing 5, for example in CCW direction, to throw off the cylinder 1, the eccenter bushing 18 will rotate about the positioning axis 5 in the same direction and essentially to the same extent. Thus, due to the similar eccentricities, the position of the axis of the positioning shaft 8 can remain unchanged.

Various changes and modifications may be made within the scope of the inventive concept.

I claim:
1. In a rotary printing machine having
   a printing cylinder (1) and a cylinder shaft (2), said cylinder and cylinder shaft defining a cylinder axis of rotation (B),
   said printing machine having a side wall (4), a bearing (5) for the shaft (2) of the cylinder;
   eccentric means (6, 7) rotatably retaining said bearing in said side wall for rotation about a bearing axis (A) which is eccentric with respect to said axis of rotation;
   an axially movable drive gear (3) with inclined or spiral gear teeth thereon, secured to said cylinder shaft;
   a threaded rotatable positioning shaft (8); and
   threaded shaft positioning means (13) secured in fixed position with respect to said side wall (4) and receiving a thread of said positioning shaft (8),
   a circumferential register adjustment system for the printing cylinder (1),
   comprising, in accordance with the invention,
   a coupling system for coupling said positioning shaft (8) to the drive gear at any selected position of the bearing means (5) in said side wall, and regardless of the relative positions of said bearing axis (A) with respect to said cylinder axis (B),
   said system including
   an eccentric bushing (18) located on said positioning shaft (8), axially fixed thereon and rotatable with respect thereto;
   rotatable means (20, 22) for coupling said eccentric bushing to the drive gear (3), said rotatable coupling means maintaining an axially fixed predetermined relation between said eccentric bushing (18) and said drive gear (3) while permitting relative rotation of said bushing and said drive gear;
   connecting link means (23, 24, 25) coupling said eccentric means (6, 7) and said eccentric bushing (18) for conjoint rotation; and
   wherein the eccentricities of the eccentric means (6, 7) and of the eccentric bushing (18) are arranged relative to each other to maintain the position of the axis (A) of the positioning shaft (8) invariable with respect to the bearing axis upon rotation of said eccentric means (5, 6).

2. The register system of claim 1, further including a first bearing (15) interposed between the positioning shaft (8) and said eccentric bushing (18); and
   wherein said rotatable coupling means includes a second bearing (20), said bearings being axially fixed on, respectively, the positioning shaft (8), said eccenter bushing (18) and with respect to said drive gear (3).

3. The register system of claim 2, further including a refention sleeve (22) secured to and axially fixed with respect to said drive gear, said second bearing (20) being rotatable in said retention sleeve.

4. The register system of claim 2, wherein at least one of said bearings comprises a ball or roller bearing (15, 18) having inner and outer races (16, 17; 19, 21), said inner and outer races being, respectively, axially fixed on the positioning shaft (8), the eccenter bushing (18) and with respect to said drive gear (3).

5. The register system of claim 3, wherein at least said second bearing (20) comprises a ball or roller bearing (20) having inner and outer races (19, 21), the inner race of said second bearing being positioned on said eccenter bushing (18) in axially fixed position and within said retention sleeve (22) in axially fixed position (23, 24, 25).

6. The register system of claim 1, wherein said connecting link means comprises a radially projecting extending extension (25) extending from said eccentric bushing (18), and a coupling rod (23) secured to said eccentric means (6, 7) and engaging said radially projecting extension.

7. The register system of claim 6, wherein said radially extending projection is formed with a forked end portion (24), said coupling rod (23) engaging in said forked end portion.

* * * * *